United States Patent [19]

Bransburg

[11] Patent Number: 4,924,844
[45] Date of Patent: May 15, 1990

[54] PORTABLE GRILL WITH INTERCHANGEABLE ACCESSORIES

[76] Inventor: Jorge M. Bransburg, Malabia 2363 - 2d G, 1425 Buenos Aires, Argentina

[21] Appl. No.: 417,635

[22] Filed: Oct. 5, 1989

[30] Foreign Application Priority Data

May 8, 1989 [AR] Argentina ................ 313860

[51] Int. Cl.⁵ .................................. F24C 1/16
[52] U.S. Cl. .......................... 126/9 R; 126/9 B; 126/37 R; 126/41 R; 99/400
[58] Field of Search ................ 126/9 R, 9 B, 25 R, 126/29, 37 R, 41 R; 99/385, 444, 400, 339, 393

[56] References Cited

U.S. PATENT DOCUMENTS

| 2,565,000 | 8/1951 | Schultz | 126/9 |
|---|---|---|---|
| 3,182,585 | 5/1965 | Rensch et al. | 99/400 |
| 3,495,524 | 2/1970 | Miles | 99/400 |
| 3,581,654 | 6/1971 | Tescula | 99/400 |
| 3,611,912 | 10/1971 | Choc | 126/9 R X |
| 3,809,053 | 5/1974 | Navarro | 126/9 R X |
| 3,976,046 | 8/1976 | Morton et al. | 126/9 R |
| 4,483,241 | 11/1984 | Vaughn | 126/9 B X |
| 4,508,096 | 4/1985 | Slattery | 126/9 R |
| 4,598,690 | 7/1986 | Hju | 126/9 R X |

FOREIGN PATENT DOCUMENTS 658358  6/1929  France ................ 99/385

Primary Examiner—Larry Jones
Attorney, Agent, or Firm—Richard C. Litman

[57] ABSTRACT

A portable grill is disclosed. The grill includes a rectangular volume which encloses a heat source with an ash tray for the burned fuel in the base thereof. A grid covers the open cooking surface of the rectangular volume. The housing forming the unit further includes stair-stepped hinged side panels which serve to support food holding accessories. The unit folds in a closed compact unit including carrying handle.

5 Claims, 2 Drawing Sheets

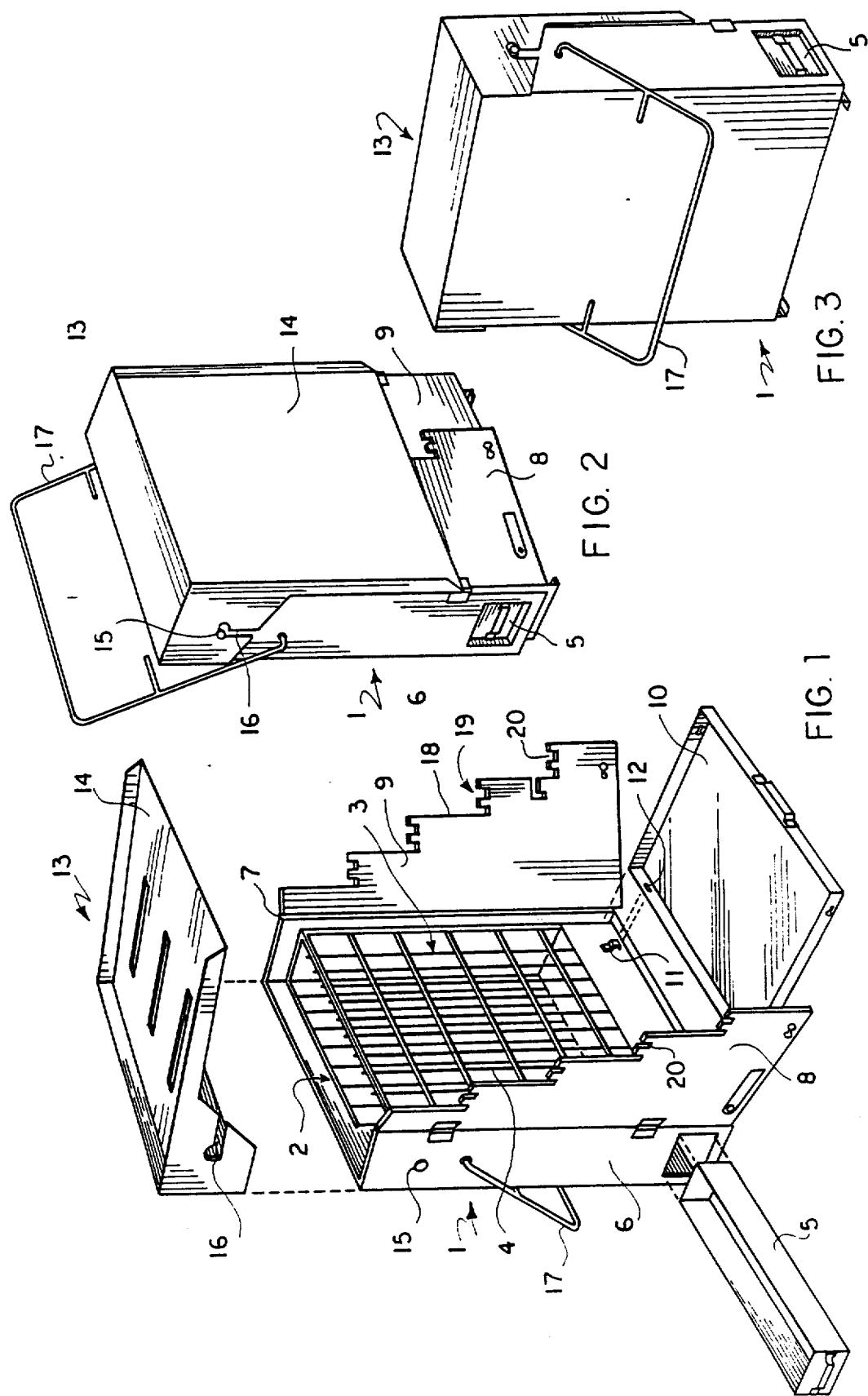

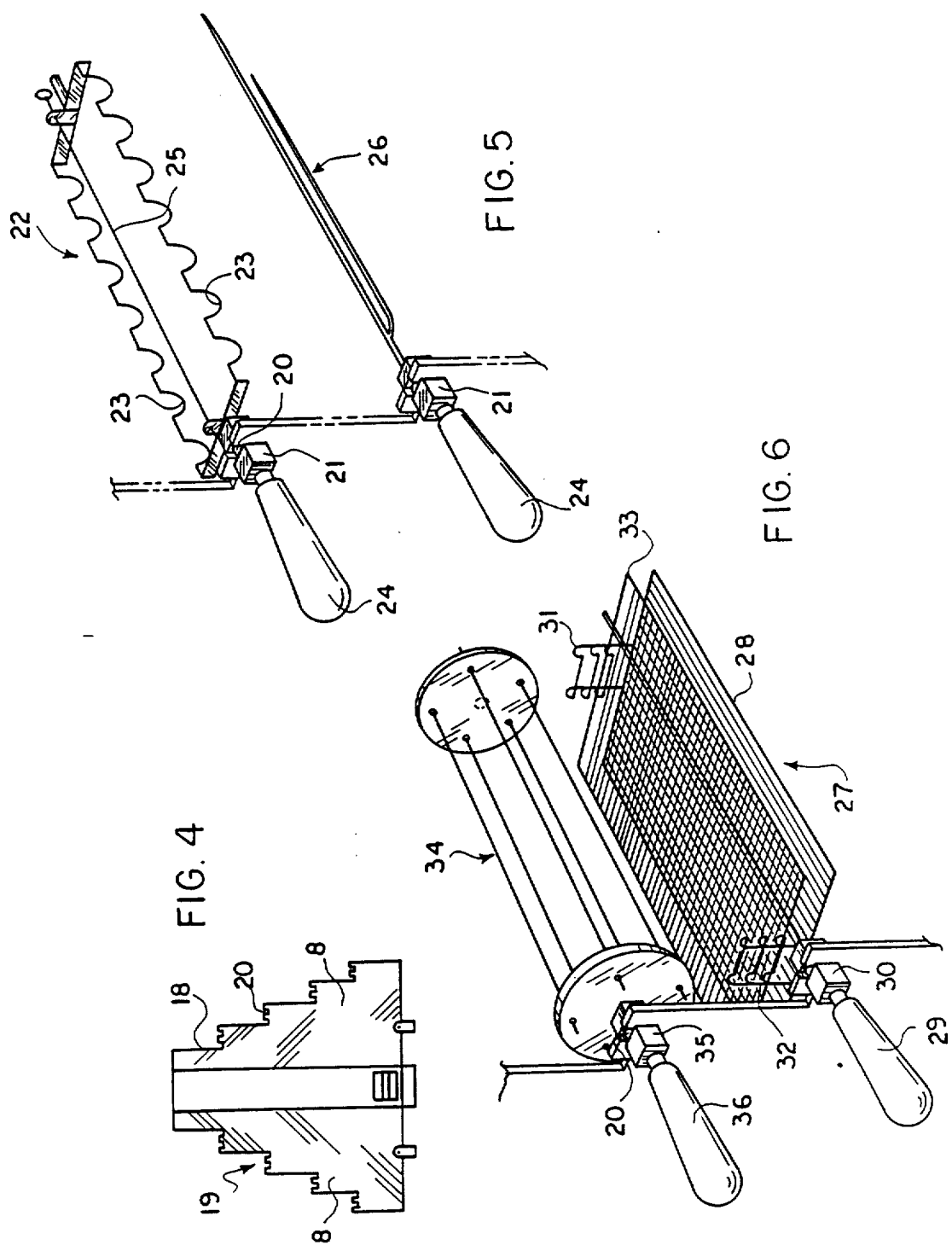

PORTABLE GRILL WITH INTERCHANGEABLE ACCESSORIES

BACKGROUND OF THE INVENTION

The present invention has for its main object a portable grill with interchangeable accessories with very particular functional and constructive characteristics, giving a device with great versatility, able to furnish an answer to almost every need and also including advantageous solutions for its cleaning, storing, transport and maintenance.

There are many grills and broilers of the type aforementioned, very much required for camping and also for households that do not have any fixed installation; these are generally made from lightweight structure, based on a movable grid of wire or iron bars, with legs and some means to support accessories, including handles and some container for storage and transport.

It is not difficult to see from experience that, invariably, existing portable grills do not give entire satisfaction to the various and different needs of customers. In fact, there is hardly found any which includes a tray for the coal or wood, and even less a tray for the ashes, thus damaging or soiling the ground and requiring a cleaning operation after the barbecue is over. Neither do they have any kind of protection from the heat, nor a means to direct the heat generated, resulting almost invariably in a great amount of wasted heat; they are also lacking the means to adapt their use with different accessories that are necessary to broil the variety of products fitted for grill-roasting, such as fish, hamburgers, pieces of poultry, sausages and red meat, also including the different degrees of heat exposure and the rotating movement that must be given to the food for an even and smooth broiling, thus adapting the barbecue to different tastes.

Those grills constituted by lightweight structures, which are proper for transport, lack completeness and cannot thus satisfy the differing requirements of customers. More elaborate grills, which have different alternative uses, are far too heavy and present problems for their transport and cannot effectively resolve the operations of setting up, disassembly, and cleaning. Such inconveniences are given an efficacious solution with the device object of the present invention, the which being light and portable, is designed to resolve all requirements that customers might desire, whether for setting up, disassembly, cleaning, or adaptation to the different modes and uses.

SUMMARY OF THE INVENTION

The grill's basic feature is its main receptacle for holding of the heat source, which is disposed vertically, and thus the coal, wood, or other heating substance or element has a fixed and foreseen place. This receptacle is a rectangular volume with flat walls, three of which are closed and three other open. Its bottom and lateral walls or sides are covered with a metallic grid which protects the walls against direct contact with red hot coals or wood, and this grid is continuous across the open sidewall, where generated heat is directed.

There are also two equal lids or covers, fixed to the sides of the main receptacle by means of hinges, and these partly prevent heat-scattering and also serve as a support for the main receptacle and for the various elements and accessories to hold the products to be broiled. At the bottom, between both lids, there is a place for a flat tray to re-collect the fats from the roasted food.

From what has been said, it is clear this invention has a constructive principle of design which is based on the form and place of the heat source, combined with the function and disposition of the lateral lids. There are numerous possibilities that can be developed with this constructive design, and they give to the object of this invention the character of an invention.

In order to illustrate the aforementioned advantages, to which customers and those used to barbecue-style cooking can add many more, and also to ease the understanding of the constructive and functional characteristics of the portable grill of the present invention, a preferred realization example will now be described which is illustrated schematically and without any scale in the annexed figures, making clear that, being only an example, it is improper to assign any limited or exclusive character to the protective limits of the present invention and can only have an illustrative intention related to the basic conception on which the appliance is based.

BRIEF DESCRIPTION OF THE DRAWINGS

FIG. 1 is a perspective view of the present invention showing the invented grill frontally, where its general appearance might be appreciated;

FIG. 2 is another perspective view that shows the grill closed, ready for storage or transport;

FIG. 3 shows the same grill in a side view and back;

FIG. 4 is a side view of a grill with the same design principle but with two sides open, and thus with double heat output and which duplicates its roasting capacity;

FIG. 5 is a perspective view of two accessories used with products to be broiled and supported over the lateral lids in position of usage; and FIG. 6 depicts other accessories amongst all that might be used with the grill of the present invention.

In all drawings, equal reference numbers indicate the same parts or constitutive elements, which are marked in the chosen example for the present illustrative explanation of the grill of the present invention.

As might be seen from FIG. 1, the portable grill protected by the present invention is constituted by a vertical receptacle 1 of rectangular volume and flat metallic walls, open on the top 2 and frontal side 3. This receptacle is internally covered with a metallic grid which prevents the falling of wood or coal pieces and also the direct contact of red-hot coals with the metal walls. There is an ash box at the bottom 5, so that the ground where it is used remains unaltered.

From the lateral walls 6 and 7 of the central receptacle, the two lateral hinged lids 8 and 9 are projected, being the support for the accessories that hold the products to be broiled, and the grill thus formed is complemented with another tray 10 to re-collect the fats, related to the main receptacle on the bottom of its frontal side by means of wedges 11 that pass through the slots of the tray 12, for a quick setup and disassembly.

The grill is completed with the upper cover 13 which, as might be seen from FIGS. 1 and 2, covers the top and lateral lids for storage and transport and is used to complete the combustion chamber during operation (it reduces the flow of coal or wood embers) and as a horizontal surface to cook thin pieces of meat such as beefsteaks, hamburgers, etc., thus offering a function which is not contemplated in ordinary grills. To use this cover in its two positions, there are two lateral pins 15, widened on their outer ends, which wedge in the lateral slots of the cover 16.

FIGS. 1-3 show the functionality of this invented appliance, covering little space when closed, and with great operative capacity when opened for use. It has a handle for transport as shown in the example 17, made from a wire rod that pivots on the lateral sides.

Another original characteristic of the present grill is the form and design of the lateral lids 8 and 9, whose border opposed to the hinged side has a stair-shaped discontinuity, in vertical 18 and horizontal 19 sections, in such a way that the lateral lids grow wider towards its outer bottom. There are special notches 20 in the horizontal sections 19 that are made from three sides which define U-shaped supports, at the same distance from the ground in both lateral lids. These notches support the dice 21 of the accessory elements of the grill, amongst which are shown those illustrated in FIGS. 5 and 6.

The heat source need not be only of coal or wood, since it is foreseen in the placing of a gas ("infrared") burner or an electric resistance inside the main receptacle 2, which can be placed vertically to give heat in the same way as described in the first example.

Always, within the same functional principle defined for this invention and as represented in FIG. 4, its operative action might be duplicated; only another pair of lateral lids are needed, opposite the first two, and also another tray at the bottom 10.

FIG. 5 shows a preferred usage, with the accessory element here the one indicated by global reference 22 being used to hold different kinds of sausages, fixed in the curved sections 23, within a small structure of the handles 24, which greatly eases manipulation. The horizontal rod 25 holds the sausages tightly so that the accessory is placed in the notch 20 and can be turned along its four positions for a better roasting and uniform distribution of heat on the surface of the products. A similar function can be executed with the other accessory 26, represented also in FIG. 5.

FIG. 6 shows an accessory 27 that is useful for holding pieces of meat or poultry of differing sizes and thicknesses. In this case, a small metallic structure 28 is also required, with its handle 29 and corresponding dice 30, with the particularity of pivoting hooks 31 and 32, used to hold the metallic grid 33, which in turn grasps or clutches the product within the structure 28. In this way, products of different sizes and thicknesses can be put to roast, as the mentioned hooks 31 and 32 allow the grid 33 to be placed at different levels. FIG. 6 also illustrates a conventional accessory 34 to broil products such as already indicated, in a way usually termed "spiedo", which also includes a dice 35 and handle 36. The aforementioned dice 21 should have slots in their middle sections, slightly wider than the thickness of the lateral lids 8, so that accessories can be firmly placed during the roasting process.

In the realization of the grill thus described and illustrated, there are modifications or alternatives that might be introduced, all of which are to be considered as variants of the same appliance, within the protection limits of the present invention the which are determined, in their fundamental aspects, by the text of the following claims.

Having described and illustrated the nature and aims of the present invention, together with the way in which it can be used or materialized, its property and exclusive rights are claimed.

I claim:

1. A portable grill with interchangeable accessories, of the type with a receptacle for the source of heat; means to put the products to be roasted at the outside of the heat generated; elements to re-collect the residues of combustion and also the fats of the broiled products; means to transport the complete appliance; and means to temporally affix such accessories that hold the products to be roasted; characterized by:

a mixture of a main receptacle for the source of heat, which is a rectangular volume of flat walls disposed in vertical position, with an ash box that moves transversally in its bottom;

the receptacle being internally covered with a metallic cord on all sides except the upper one;

with a removable cover with two main sides, a small one that closes the top of the receptacle when disposed in a storage or transport position and the other which is bigger and can be used as a roasting surface in the horizontal position;

including two equal lids fixed with hinges to the lateral sides of the main receptacle, which are used to support the accessories which hold the products to be broiled and have their front border stair-shaped in vertical and horizontal alternating sections, with at least one U-shaped notch in the horizontal sections; and the whole appliance is complemented with a tray to recollect the fats which is disposed at the bottom, between the lateral lids, and connected to the main receptacle by means of wedges, being the aforementioned U-shaped notches to support the dice that the accessories have near their handles.

2. A portable grill as claimed in claim 1, characterized by:

an upper removable cover that has two principal and flat sides that includes slots in its lateral ones, which are to fix the cover in place with the two pins that main receptacle has in the upper part of its lateral walls, over the pivoting axes of the handle to transport the whole appliance.

3. A portable grill as claimed in claim 1, characterized by:

the accessory used to hold the products to be roasted has a dice-shaped device that rests in the U-shaped notches of at least one of the lateral lids and is constituted by a metallic structure with two lateral profiles with a succession of curved sections of support over the same line, being completed with a longitudinal rod articulated at one end, which rod is used to hold the products to be roasted.

4. A portable grill as claimed in claim 1, characterized by:

an accessory that holds the products to be broiled, with dice-shaped notches on at least one of the lateral lids, consisting of one metallic structure in continuity with the handle and including pivoting hooks in both ends and whose free ends contain wedges in the small sides of a metallic grid disposed over the products to be roasted, facing the aforementioned metallic structure.

5. A portable grill as claimed in claim 1, characterized by:

four lateral lids projecting from the sides of the main structure, two for each of the wide sides of the central receptacle, and facing each other in opposed orientations.

* * * * *